C. BAILEY.
Fertilizer-Distributer.
No. 164,509.  Patented June 15, 1875.
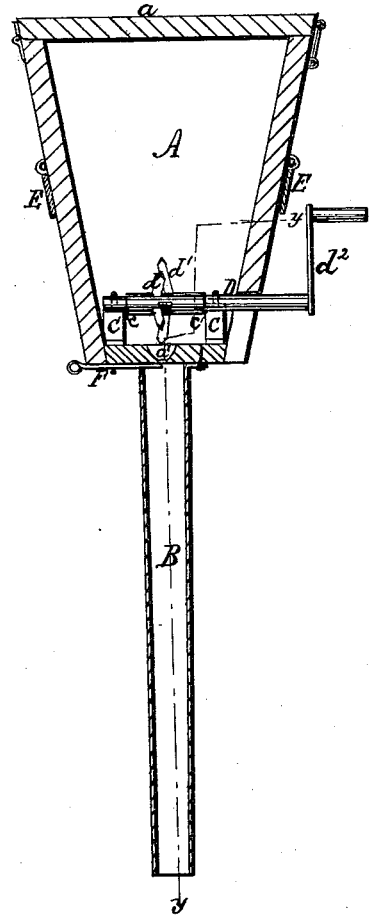
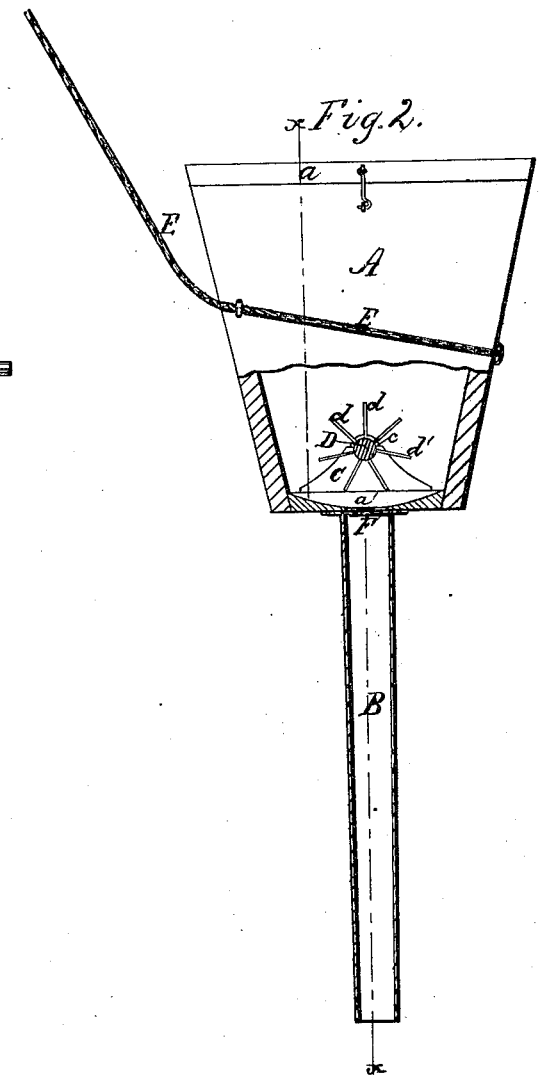
WITNESSES:
A. B. Robertson
Solon C. Kemon
INVENTOR:
Clemon Bailey
BY
ATTORNEYS.

UNITED STATES PATENT OFFICE.

CLEMON BAILEY, OF KINSTON, NORTH CAROLINA, ASSIGNOR TO HIMSELF, T. A. HARVEY, AND JAMES P. BRYAN, OF SAME PLACE.

IMPROVEMENT IN FERTILIZER-DISTRIBUTERS.

Specification forming part of Letters Patent No. 164,509, dated June 15, 1875; application filed May 18, 1875.

*To all whom it may concern:*

Be it known that I, CLEMON BAILEY, of Kinston, in the county of Lenoir and State of North Carolina, have invented a new and Improved Fertilizer-Distributer; and I do hereby declare that the following is a full, clear, and exact description of the same, reference being had to the accompanying drawing, forming a part of this specification, in which—

Figure 1 is a front sectional elevation in line $x\ x$ of Fig. 2; Fig. 2, a side elevation cut away in line $y\ y$ of Fig. 1.

The invention contemplates a novel combination of instrumentalities to form a hand-distributer of ground, granulated, or powdered fertilizers.

The invention will first be fully described in connection with the drawing, and then pointed out in the claim.

A represents a hopper, having hinged cover $a$, latching down with hook and eye, in the usual manner, and the bottom slot $a'$, through which the manure finds its outlet into a long tube, B, reaching nearly to bottom of furrow. On the inside of hopper are placed two parallel uprights, C C, on the top of which is journaled shaft D, in the bearings $c\ c$. On this shaft are centrally arranged, over hole $a'$, a series of blades, $d\ d^1$, by preference alternately obliqued in reverse directions, and at one end a hand-crank arm, $d^2$. E is a strap or cord, by which the distributer is secured to and in front of the sower. The latter walks in the furrow and revolves the shaft, while the blades bring down and discharge gradually the requisite quantity of fertilizer into the long tube B, which is directly over the middle of furrow. A slide, F, in the bottom of hopper, serves to regulate the quantity of fertilizer allowed egress at the outlet for each revolution of shaft.

As it is necessary in windy weather, and, indeed, at all times, for the persons who sow by hand to stoop down as they walk, and hold themselves in a very irksome position, my device will greatly lessen the labor and inconvenience. Moreover, the fertilizer may be distributed with much greater regularity, and with much more rapidity.

Having thus described my invention, what I claim as new is—

A hand-sower for fertilizers, consisting of hopper A, having bottom slot $a'$, and crank-shaft D, having obliquely-arranged blades $d$ and the long tube B, all in combination, as shown and described.

CLEM. BAILEY.

Witnesses:
WM. W. N. HUNTER,
SAML. A. BARTLESON.